United States Patent Office 3,355,276
Patented Nov. 28, 1967

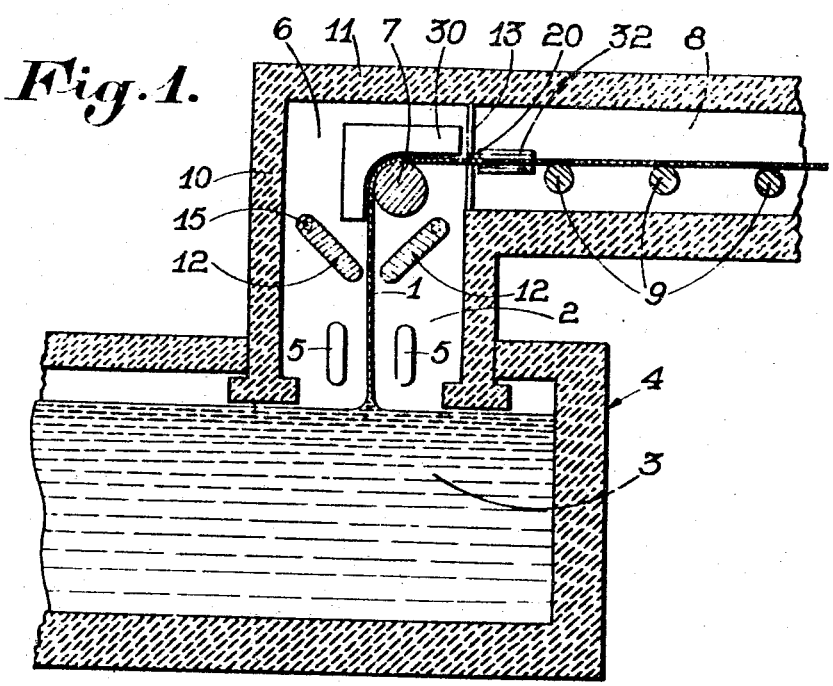
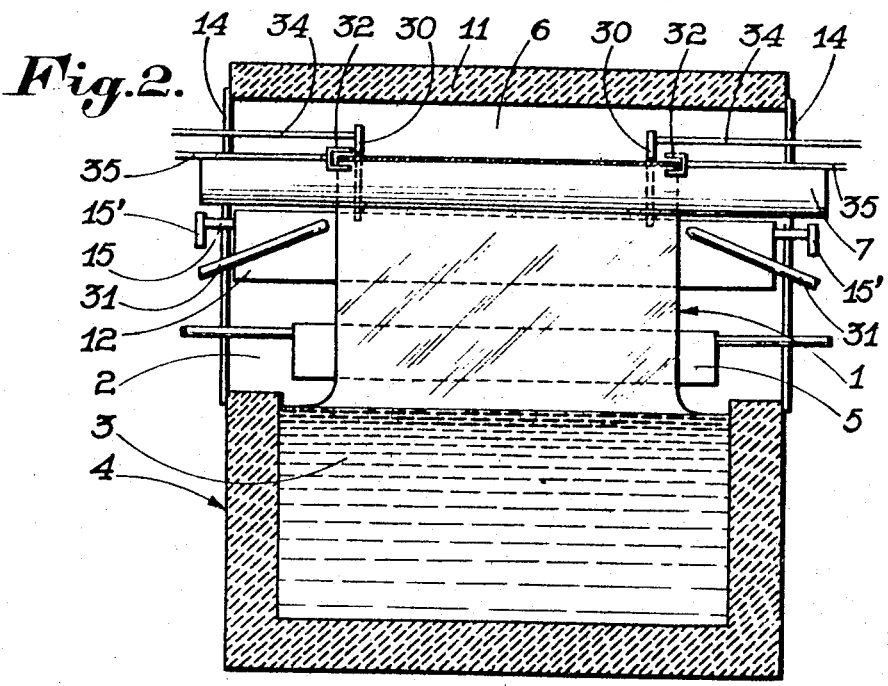

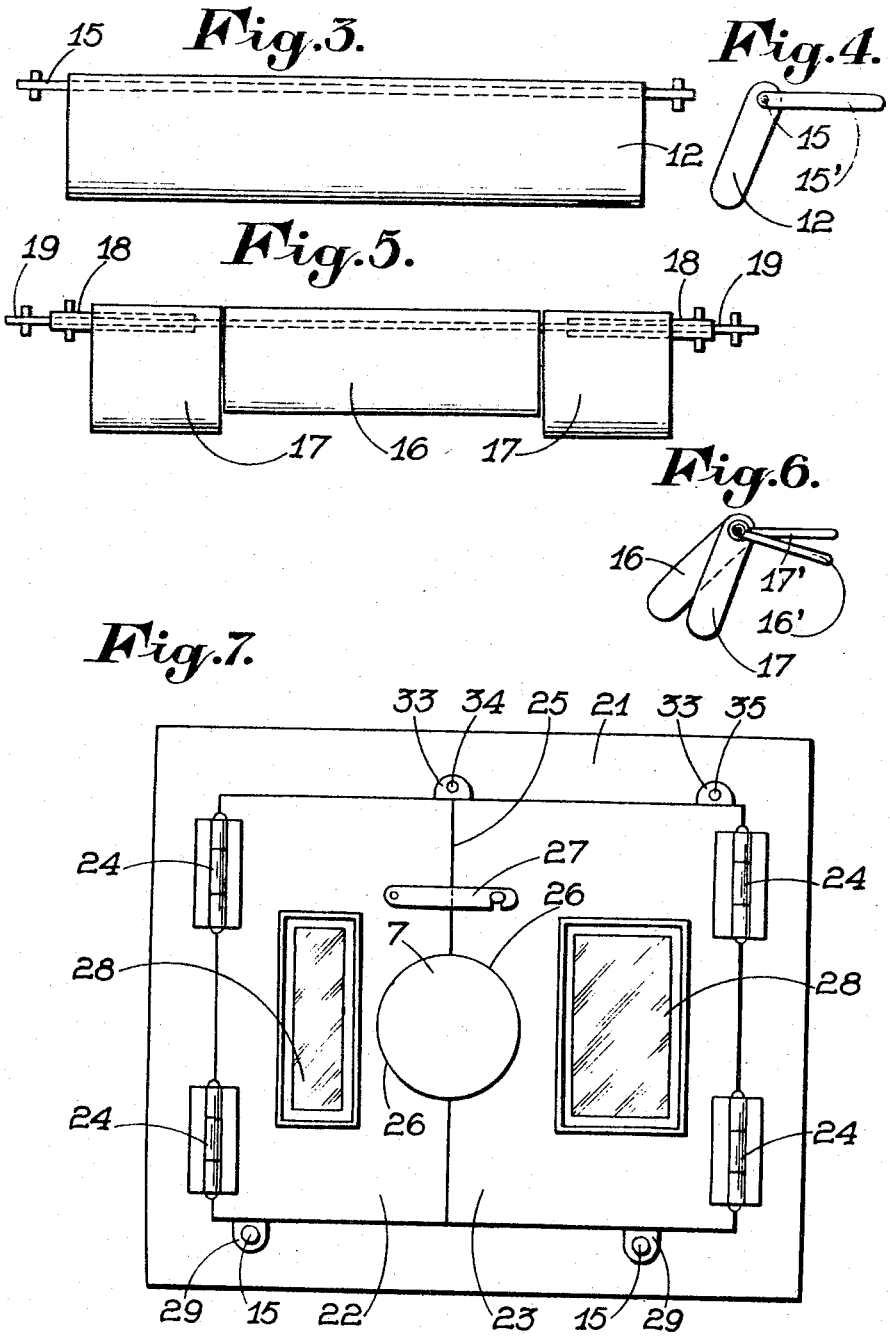

3,355,276
BENDING CHAMBER FOR THE MANUFACTURE
OF SHEET GLASS BY DRAWING
Gustave Javaux, Brussels, Belgium, assignor to Glaverbel,
Watermael-Boitsfort, Belgium, a Belgian company
Filed Sept. 10, 1963, Ser. No. 307,841
Claims priority, application Belgium, Oct. 31, 1962,
499,150
7 Claims. (Cl. 65—194)

The present invention relates to the manufacture of sheet glass by continuous drawing, bending and annealing.

After it has been drawn vertically from the surface of a molten glass bath, the sheet, still in a plastic condition, is bent over a roller and directed into a horizontal annealing zone. Now it is well known that in the bending zone, the sheet is subjected to unfavourable heat conditions which are liable to affect the quality of the surface of the sheet. These are for example gaseous currents which are heterogeneous as regards temperature and which originate from the drawing zone and the annealing zone, but particularly admissions of cold air through the unclosed sides of the machine. These currents sweep irregularly over the surface of the sheet.

On the other hand, the burners which usually heat the edges of the glass before the bending thereof extend their action in undesirable manner towards the central part of the said sheet, and this causes inadmissable tensions at the time of annealing and deformations in the surface of the sheet over a large part adjacent the edges.

The present invention makes it possible to maintain good thermal homogeneity of the sheet and to reduce considerably the tensions in the region of the edges.

According to the process constituting the invention, the bending of the sheet is effected in a closed chamber which is isolated from the drawing zone, the annealing zone and also the outside atmosphere, and in which the central part of the sheet is protected from the action of the burners for heating the edges before bending, after which the thermal uniformity of the sheet is reestablished by controlling the temperature of its edges.

The arrangement according to the invention comprises a closed bending chamber, limited in a downward direction by refractory screens, in an upward direction by a partition isolating it from the annealing zone and laterally by closure means disposed approximately in the vertical plane of the walls of the tank. Disposed in this chamber are screens or baffles disposed in the vicinity of the ends of the bending roller, perpendicularly of the sheet and adapted to protect the central portion of the sheet from the radiation of the burners for heating the edges before bending. It also comprises elements for controlling the temperature of these edges, which edges are capable of reestablishing uniformity of temperature between the said edges and the remainder of the sheet after the bending operation.

The screens or baffles closing the bending chamber in a downward direction are advantageously formed by dampers disposed on either side of the drawn glass sheet and fixed on horizontal rods which are parallel to the plane of the glass sheet and capable of regulating the inclination of the dampers and also the distance of the lower edges from these latter so as to vary at will the lower opening of the chamber in order to act on the gas currents which are in motion in the vicinity of the sheet. These screens are preferably of a refractory material, because they thus serve as automatic regulating elements for the temperature through the sheet. A metallic material having a high reflective power can also advantageously be employed for these screens or baffles. Known heating and/or cooling means can be provided for each of the latter. It may in addition be of interest to subdivide each baffle into several sections, each of which is capable of being given an individual adjustable inclination, this permitting greater flexibility and accuracy in the regulation of the movements of gas.

The fluid-tight closure means for the bending chamber are for example constituted by metal sheets, possibly doubled and made of an insulating material such as asbestos, and comprising flaps mounted on a frame. They are provided with openings in which are hermetically fitted the shaft ends of the bending roller and also the connecting elements for the control and supply of the internal members of the chamber. The closure means advantageously have openings which are closed by a heat-resistant glass pane in order to be able to inspect the interior of the chamber. The flaps are preferably mounted on hinges and open inwardly for reducing the space required.

The partition separating the bending chamber from the annealing zone and the screens for protecting the central portion of the sheet from the action of the burners for the edges are preferably formed by an insulating material, for example consisting of asbestos clamped between two metal sheets. In addition, the edge screens are with advantage arranged on a device permitting the spacing thereof from the edge of the sheet to be regulated.

The elements for the heat control of the edges are advantageously formed of cooling and/or heating components of U shape, burners or electric resistances enclosing the said edges. The cooling components are possibly traversed by a cooling fluid. It is also preferable to provide a means for regulating the position of the control elements relatively to the edges of the sheet so as to regulate the intensity and the radius of their action on said edges.

The accompanying drawing illustrates different embodiments of the invention by way of example.

FIG. 1 is a vertical section perpendicular to the plane of the sheet and through a bending chamber according to the invention.

FIG. 2 is a section parallel to the plane of the sheet.

FIGS. 3 and 4 show one embodiment of the screens separating the bending chamber from the drawing chamber.

FIGS. 5 and 6 show another embodiment of these screens.

FIG. 7 shows an embodiment of the lateral closure devices for the bending chamber.

The glass sheet 1 (FIGS. 1 and 2) is drawn in a drawing chamber 2 from the surface of a glass bath 3 contained in a tank 4. After having travelled between the cooling nozzels 5, the drawn sheet enters a bending chamber 6, in which it is bent over a roller 7 and driven in an annealing zone or shaft 8 by supporting rollers 9.

The bending chamber 6 is formed by the vertical wall 10, the arch 11, the lower screens 12, a partition 13 and lateral closure devices 14 (FIG. 2). The lower screens 12 which separate the bending chamber 6 from the drawing chamber 2 are formed of refractory material, for example, and are fixed to rods 15 (FIGS. 3 and 4) which permit their angle of inclination and their opening to be regulated, for example by means of levers 15'. Heating elements, for example, electric resistances and/or cooling elements can be incorporated in the said screens for regulating the temperature thereof.

According to a modification shown in FIGS. 5 and 6, the screens 12 are formed of several sections which can be individually regulated, namely, a central section 16 and lateral sections 17. The sections 17 are fixed on tubes 18, while a rod 19 passing through the tubes 18 is fast with the central section 16. The control is effected by means of levers 16' and 17'.

The partition 13 (FIGS. 1 and 2) insulating the bending chamber 6 from the annealing shaft is formed by a metal sheet preferably covered with an insulating material, such as asbestos, and comprises a slot 20 for the passage of the glass sheet 1.

FIG. 7 shows one embodiment of the lateral closure devices 14. These latter are formed of a metal frame 21 comprising two flaps 22, 23 mounted on hinges 24. The flaps are of such a width that their edges 25 are disposed on the vertical axial plane of the bending roller 7, so that two semi-circular openings 26 formed one in each of the flaps provide a passage for this roller and permit the opening or closing of the door without this operation being impeded by the said roller. The flaps are held closed by a latch 27. It is preferable to provide the opening of the flaps towards the interior of the chamber so as not to obstruct the approach to the machine. A window 28 formed by a resistant glass pane is formed in each of the wings. The upper edge of the lower part of the frame carries two indentations 29 through which extend the shafts 15 of the screens 12, and indentations 33 are provided at the upper edge of the frame to permit the passage of the rods 34 and 35 enabling the position of the screens 30 and of the U-shaped elements 32 to be regulated. The rod 35 can be cranked if required.

The screen 30 (FIGS. 1 and 2) is formed for example of a sheet of asbestos clamped between two metal sheets and disposed perpendicularly of the glass sheet near each end of the bending roller 7 so as to limit the action of the burners 31 to the edges of the glass sheet. At the entry into the annealing shaft, an element 32 of U-shape encloses each of the edges of the sheet in order to bring their temperature to that of the remainder of the sheet. These elements advantageously comprise cooling and/or heating means, for example a circulation of cooling fluid and/or electrical resistances. The regulation of the position of the screens 30 is effected by means of the rods 34, and the regulation of the position of the elements 32 by means of the rods 35.

It is obvious that the invention is not limited to the embodiments which have been described and illustrated by way of example and there would be no departure from the scope thereof by incorporating modifications.

I claim:

1. In apparatus for forming sheet glass comprising a drawing chamber through which the sheet is drawn vertically from a molten glass bath, a substantially closed bending chamber located above said drawing chamber, and an annealing chamber adjoining said bending chamber and offset from said drawing chamber, first baffle means shielding said bending chamber from said drawing chamber while permitting the glass sheet to pass vertically therethrough, second baffle means shielding said bending chamber from said annealing chamber while permitting the bent glass sheet to pass therethrough, and third baffle means forming at least one of the vertical walls enclosing said bending chamber, a bending roll in the bending chamber defined by said baffle means, means in said bending chamber for heating the edges of the glass sheet before the bending thereof about said bending roll, baffles disposed in the vicinity of the ends of the bending roll and shielding the central portion of the glass sheet from the radiation of said heating means, and temperature modifying means for modifying the temperature of that portion of the bent sheet that had been heated by said edge heating means to reestablish the thermal uniformity of the sheet before any substantial annealing takes place.

2. In apparatus as defined in claim 1, in which said first baffle means shielding said bending chamber from said drawing chamber comprise a plurality of members constituted of a refractory material and movable relative to each other.

3. In apparatus as defined in claim 2, in which each of said members is composed of a plurality of sections movable relative to each other.

4. In apparatus as defined in claim 1, in which said third baffle means forming a vertical wall of said bending chamber include a plurality of flaps forming an entry through said baffle means into said bending chamber, each of said flaps having an enlarged opening closed by heat-resistant glass windows.

5. In apparatus as defined in claim 1, in which said third baffle means forming a vertical wall of said bending chamber include a plurality of flaps forming an entry through said baffle means into said bending chamber, said flaps being hinged to open inwardly of said chamber and being provided with mating openings in the outer edges thereof enabling them to be so opened without coming into contact with said bending roll.

6. In apparatus as defined in claim 1, in which said second baffle means shielding said bending chamber from said annealing chamber is constituted of a vertically disposed panel of insulating material having a horizontal slot for the passage of the glass sheet into said annealing chamber.

7. In apparatus as defined in claim 1, in which said applying means is located in said annealing chamber adjacently to said second baffle means shielding said bending chamber from said annealing chamber.

References Cited

UNITED STATES PATENTS

| 807,298 | 12/1905 | Lubbers et al. | 65—95 |
| 991,642 | 5/1911 | Player | 65—95 |
| 1,586,618 | 6/1926 | Ferngren | 65—90 |
| 1,684,438 | 9/1928 | Ferngren | 65—90 |
| 1,759,235 | 5/1930 | Mambourg | 65—204 |

DONALL H. SYLVESTER, Primary Examiner.

G. R. MYERS, Assistant Examiner.